G. BURKHARDT & A. HERMANN.
STRAINER FOR COFFEE.

No. 173,265. Patented Feb. 8, 1876.

Witnesses.
Otto Hufeland.
Robt. E. Miller.

Inventors.
Gustav Burkhardt
August Hermann
per
Van Santvoord & Hauff
Attorneys.

UNITED STATES PATENT OFFICE.

GUSTAV BURKHARDT AND AUGUST HERMANN, OF HOMER, ILLINOIS.

IMPROVEMENT IN STRAINERS FOR COFFEE.

Specification forming part of Letters Patent No. 173,265, dated February 8, 1876; application filed January 14, 1876.

*To all whom it may concern:*

Be it known that we, GUSTAV BURKHARDT and AUGUST HERMANN, both of Homer, county of Champaign and State of Illinois, have invented a new and useful Improvement in Floating Strainers for Making Coffee, Tea, &c., which improvement is fully set forth in the following specification, reference being had to the accompanying drawing, in which—

Figure 1:
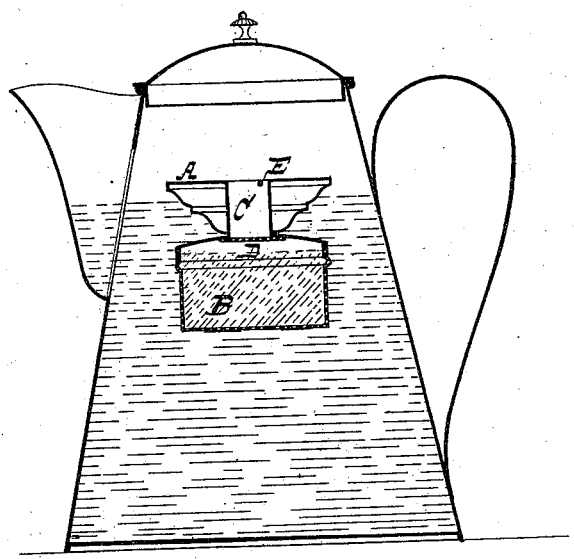
Figure 2:
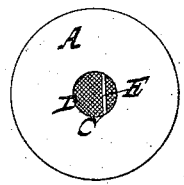
Figure 3:
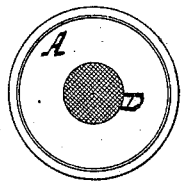

Figure 1 represents a vertical central section of our improvement. Fig. 2 is a plan view thereof. Fig. 3 is an inverted plan view of the float.

Similar letters indicate corresponding parts.

Our invention relates to a floating strainer for making coffee or tea, and other beverages of a similar nature; and consists in a float from which depends a strainer, and through which extends a tube which communicates with the strainer, in such a manner that if the strainer is partially or wholly filled with coffee or tea, and the whole is placed in a pot with water which is made to boil, the coffee or tea is not only immersed in the water, but is subjected to a constant filtration or draining by the water, which, in the process of ebullition, rises slightly above the float, and, passing through the tube, enters the strainer from an upper direction, and by this means a beverage of superior quality is obtained.

In the drawing, the letter A designates the float, and B is the strainer, of our apparatus, while C is the tube which passes through the float and communicates with the strainer. The float A is, in this example, made in the form of a hollow vessel of sheet metal, while the strainer B is made also of sheet metal which is perforated, as shown. The tube C extends in a vertical direction through the float A, and is so arranged as not to affect the air and water tightness of the float; but the tube may, if seen fit, be made to extend through the float obliquely, or more than one tube may be used with a good result.

It will be readily understood that if coffee or tea is put in the strainer B, and our apparatus is placed in a pot with water which is made to boil, the coffee or other substance is immersed in the water, while at the same time the water, in the process of ebullition, sweeps over the float A, and, passing through the tube C, enters the strainer B from an upper direction, whereby the coffee or tea is subjected to a constant filtration; hence its flavor is, to the greatest possible extent, extracted, and a beverage of superior quality is obtained.

Our apparatus is adapted not only to making tea or coffee, but also a variety of other beverages which it is desirable to obtain in a clear state.

Across the tube C extends a sieve, D, for the purpose of preventing the escape of coffee, tea, or other substance placed in the strainer B, in an upper direction, the sieve being, in this example, situated at the lower end of the tube. The sieve D is made stationary; but it may be made movable, in which case the coffee or other substance may be introduced to and taken from the strainer B through the tube C, which purpose is, in the present example, accomplished by making the strainer in two parts which are detachable from each other. The tube C contains a cross-piece, E, by which our apparatus can be lifted out of and placed in a tea or coffee pot with facility.

What we claim as new, and desire to secure by Letters Patent, is—

A floating strainer for making tea, coffee, and other beverages of a similar nature, constructed of a float, A, strainer B, and tube C, substantially as described.

In testimony that we claim the foregoing we have hereunto set our hands and seals this 24th day of December, 1875.

GUSTAV BURKHARDT. [L. S.]
AUGUST HERMANN. [L. S.]

Witnesses:
MICHAEL M. DUNGAN,
JOHN UPP.